United States Patent
Ramseyer et al.

(10) Patent No.: US 11,953,359 B2
(45) Date of Patent: Apr. 9, 2024

(54) COIL APPARATUS OF AN OSCILLATION SENSOR OF A MEASURING TRANSDUCER, MEASURING TRANSDUCER OF A MEASURING DEVICE AND MEASURING DEVICE

(71) Applicant: Endress+Hauser Flowtec AG, Reinach (CH)

(72) Inventors: Severin Ramseyer, Münchenstein (CH); Benjamin Schwenter, Breitenbach (CH); Marc Werner, Grenzach-Wyhlen (DE); Claude Hollinger, Aesch (CH); Martin Stucki, Pratteln (CH)

(73) Assignee: Endress+Hauser Flowtec AG, Reinach (CH)

(*) Notice: Subject to any disclaimer, the term of this patent is extended or adjusted under 35 U.S.C. 154(b) by 522 days.

(21) Appl. No.: 17/268,878

(22) PCT Filed: Jul. 30, 2019

(86) PCT No.: PCT/EP2019/070467
§ 371 (c)(1),
(2) Date: Feb. 16, 2021

(87) PCT Pub. No.: WO2020/035302
PCT Pub. Date: Feb. 20, 2020

(65) Prior Publication Data
US 2021/0310843 A1    Oct. 7, 2021

(30) Foreign Application Priority Data
Aug. 16, 2018   (DE) .................... 10 2018 119 942.2

(51) Int. Cl.
*G01F 1/84*    (2006.01)
*G01N 9/00*    (2006.01)
*H01F 27/28*   (2006.01)

(52) U.S. Cl.
CPC .......... *G01F 1/8422* (2013.01); *G01F 1/8427* (2013.01); *G01N 9/002* (2013.01); *H01F 27/2804* (2013.01); *G01N 2009/006* (2013.01); *H01F 2027/2809* (2013.01)

(58) Field of Classification Search
CPC ..... G01F 1/8422; G01F 1/8427; G01N 9/002; G01N 2009/006; H01F 27/2804; H01F 2027/2809; H01F 5/003
See application file for complete search history.

(56) References Cited

U.S. PATENT DOCUMENTS 5,349,872 A * 9/1994 Kalotay ................ G01F 1/8413
73/861.355
2005/0284210 A1  12/2005 Schmidt et al.
(Continued)

FOREIGN PATENT DOCUMENTS

CN    101903754 A    12/2010
CN    102590634 A    7/2012
(Continued)

OTHER PUBLICATIONS

Lee, C.K., Su, Y.P., Hui, S. Y. R., Multilayer Stacked Coreless Printed Spiral Winding Inductor with Wide Frequency Bandwidth, IEEE, 978-1-4244-2893-09/09, 2009, 1002-1009.

*Primary Examiner* — Tarun Sinha
(74) *Attorney, Agent, or Firm* — Kelly J. Smith; Endress+Hauser (USA) Holding, Inc.

(57) ABSTRACT

The invention relates to a coil apparatus of an oscillation sensor or exciter of a measuring transducer or a measuring device for measuring a density or mass flow of a medium flowing through a measuring tube of the measuring trans-
(Continued)

ducer or measuring device, comprising: a circuit board having a circuit board layer, at least one coil registering or producing a time varying magnetic field, wherein the coil has a winding region and a central region lacking turns of a winding, wherein the central region of a coil has a rectangular shape with oppositely lying, first sides and with oppositely lying, second sides, wherein the first sides have a first side length, and wherein the second sides have a second side length, wherein the electrically conductive trace has a trace breadth of at least 30 micrometer, wherein a ratio of first side length to second side length is greater than 3.25.

7 Claims, 5 Drawing Sheets

(56) References Cited

U.S. PATENT DOCUMENTS

| | | |
|---|---|---|
| 2008/0143194 A1 | 6/2008 | Laughlin |
| 2012/0182027 A1 | 7/2012 | Jagiella et al. |
| 2013/0099729 A1 | 4/2013 | Yoon et al. |

FOREIGN PATENT DOCUMENTS

| | | |
|---|---|---|
| DE | 19811578 A1 | 10/1999 |
| DE | 102015120087 A1 | 5/2017 |
| DE | 202017006709 U1 | 2/2018 |
| DE | 202017006709 U1 | 3/2018 |
| GB | 1068068 A | 5/1967 |
| RU | 2155939 C2 | 9/2000 |

\* cited by examiner

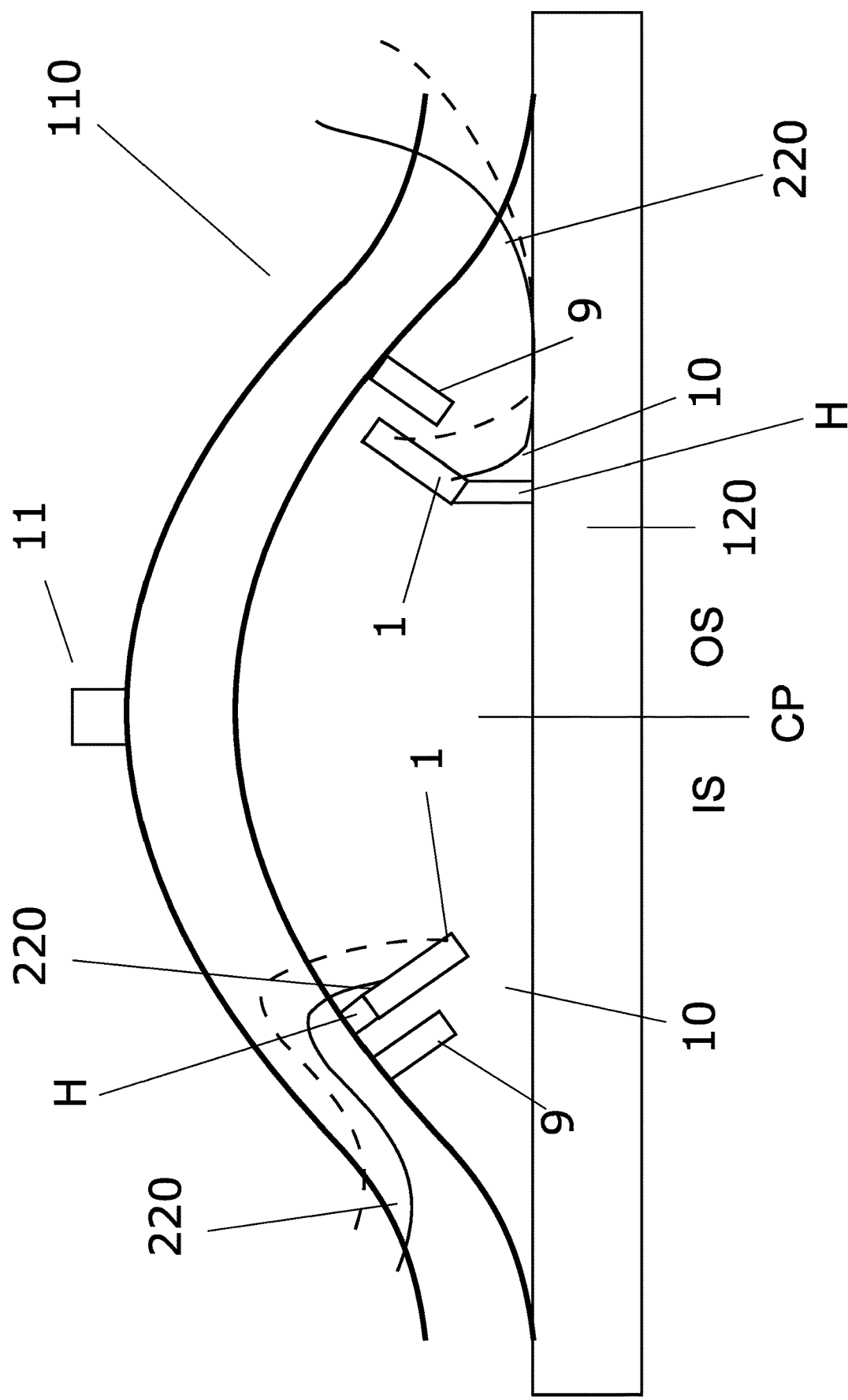

COIL APPARATUS OF AN OSCILLATION SENSOR OF A MEASURING TRANSDUCER, MEASURING TRANSDUCER OF A MEASURING DEVICE AND MEASURING DEVICE

CROSS-REFERENCE TO RELATED APPLICATIONS

The present application is related to and claims the priority benefit of German Patent Application No. 10 2018 119 942.2, filed on Aug. 16, 2018, and International Patent Application No. PCT/EP2019/070467 filed on Jul. 30, 2019, the entire contents of which are incorporated herein by reference.

TECHNICAL FIELD

In the case of a measuring device, by means of which density and/or a mass flow of a medium led through at least one measuring tube of the measuring device is to be ascertained, oscillations imposed on the measuring tube can be taken into consideration for measuring density and/or mass flow.

BACKGROUND

For measuring the oscillations, usually sensors having a coil apparatus and a magnet apparatus are used, wherein the measuring tube oscillations bring about a relative movement between the coil apparatus and the magnet apparatus, so that an electrical voltage is induced in a coil of the coil apparatus.

Such a measuring device is disclosed, for example, in DE102015120087A1, wherein a coil apparatus includes planar coils, which are embodied at least sectionally spiral shaped. In a variant, a planar coil has a rectangular shape with a three-quarter winding, to which a spirally formed section is attached in a central region. In order to induce an electrical voltage in the spiral shaped section, a magnetic field passing through the central region must fulfill a resonance condition of the spiral shaped section. Measuring tube oscillations can thus be registered in a narrow oscillation frequency range. In another variant, a planar coil is constructed multilayered and circularly. It has been found that circular coils are simpler to manufacture, however, are burdened with a low sensitivity of a sensor for the measuring tube oscillations.

SUMMARY

As object of the invention is, consequently, to provide for a sensor, a measuring transducer as well as a measuring device a coil apparatus, by means of which better sensitivity for measuring tube oscillations is achieved.

The object is achieved by a coil apparatus, by a measuring transducer, as well as by a measuring device as defined in the present disclosure.

A coil apparatus of the invention for an oscillation sensor or oscillation exciter of a measuring transducer or a measuring device for measuring a density or a mass flow of a medium flowing through at least one measuring tube of the measuring transducer, or measuring device, includes:

a circuit board having at least one circuit board layer, wherein each circuit board layer has a first face and second face planparallel to the first face, at least one coil adapted for registering or producing a time varying magnetic field, wherein the coil is embodied at least sectionally by means of an electrically conductive trace, wherein the coil is arranged on the first face and/or second face of a circuit board layer, wherein the at least one coil has, in each case, a first coil end and, in each case, a second coil end, wherein the at least one coil has, in each case, a winding region and a central region lacking turns of a winding, wherein the central region of a coil has a rectangular shape with a first side and with a second side, wherein the first side has a first side length, and wherein the second side has a second side length, wherein the rectangular shape of the central region has a first side bisector belonging to the first side as well as a second side bisector belonging to the second side, wherein the electrically conductive trace has a trace breadth of at least 30 micrometer, characterized in that a ratio of first side length to second side length is greater than 2 and especially greater than 3 and preferably greater than 3.75.

By providing a rectangular shape having a long side and a short side, a movement of a magnet in the direction of the short side can be very precisely registered and measured, especially when the magnet has in the direction of the first side an extent in the region of the first side length.

Then even a small movement of the magnet compared with conventional coil apparatuses is sufficient to provide a noticeable change of a magnetic flux through the coil and, because of this, induction of an electrical voltage in the coil.

In an embodiment, the conductive trace has a trace centerline, wherein adjoining coil turns have a turn separation from the trace centerline, wherein the turn separation is less by a factor F than two times the trace breadth, wherein F is at least 1, and especially at least 1.2 and preferably at least 1.4.

In this way, a planar coil can be especially closely packed and a sensitivity to changes of a magnetic field passing through the coil increased.

In an embodiment, an outer contour of the winding region has a rectangular shape.

In an embodiment, the at least one coil has, in each case, at least 4, and especially at least 5 and preferably at least 6 turns, and/or wherein a total number of turns of the at least one coil is at least 65, and especially at least 70 and preferably at least 72.

By superimposing a plurality of planar coils on different layers, a sensitivity to changes of a magnetic field passing through the coils can be increased.

In an embodiment, a plurality of circuit board layers have, in each case, a coil with, in each case, a first coil end and, in each case, a second coil end, wherein the coils are interconnected serially and/or in parallel with one another, wherein the coils of different circuit board layers upon applying an electrical direct voltage produce constructively interfering magnetic fields.

By superimposing a plurality of planar coils on different layers, a sensitivity to changes of a magnetic field passing through the coils can be increased.

In an embodiment, first coil ends are connected by means of a first via, and second coil ends are connected by means of a second via, or wherein adjoining coils are connected by means, in each case, of one of their coil ends by, in each case, a via, wherein, in each case, an end of outer coils is connected, in each case, with a contacting element.

In an embodiment, the first side length is at least 3 millimeter and especially at least 4 millimeter and preferably at least 5 millimeter and/or the first side length is, at most, 20 millimeter and especially, at most, 15 millimeter and preferably, at most, 12 millimeter, and/or wherein the second side length is at least 0.3 millimeter and especially at least 0.5 millimeter and preferably at least 1 millimeter and/or, at most, 5 millimeter and especially, at most, 4 millimeter and preferably, at most, 3 millimeter.

Larger geometric coil dimensions improve a signal/noise ratio, when a magnet applied for induction of electric fields in the coil has relative to the first side similar dimensions. A magnet must not, however, be too heavy, since otherwise it can influence measuring tube oscillations to an undesirable degree. One skilled in the art with experience in the construction of measuring transducers, or measuring devices, of the type used for the invention can estimate maximum geometric dimensions of such a magnet and therefrom derive upper limits for the first side, and second side, of the coil.

A measuring transducer of the invention for a measuring device for registering a mass flow or a density of a medium flowing through at least one measuring tube of the measuring transducer includes:

the at least one measuring tube having an inlet and an outlet and adapted to convey the medium between inlet and outlet;

at least one exciter, which is adapted to excite the at least one measuring tube to execute oscillations; and at least two sensors, which are adapted to register deflections of oscillations of at least one measuring tube, wherein the exciter as well as the sensors have, in each case, a coil apparatus and, in each case, a magnet apparatus, wherein the magnet apparatuses are movable relative to their coil apparatuses, and wherein the magnet apparatus and the coil apparatus of an exciter, or sensor, as the case may be, interact by means of magnetic fields, wherein the measuring transducer has a support body, which is adapted to hold the at least one measuring tube, wherein the sensors have, in each case, a coil apparatus of the invention, wherein a measuring tube oscillatory deflection has an oscillation direction in parallel with the second side of the rectangular shape of the central region.

By orienting the coil apparatus in such a manner that the oscillation direction of the at least one associated measuring tube extends in parallel with the short, second side of the rectangular shape of the central region, the coil apparatus has an increased sensitivity to relative movements of the magnet apparatus.

The measuring of a flow of the medium through the measuring tube can be accomplished, in such case, by the Coriolis measuring principle.

In an embodiment, the magnet apparatus of a sensor or exciter on at least one measuring tube has at least one magnet having at least one magnet end surface facing toward the coil apparatus, wherein the magnet end surface is bounded by two, first magnet edges arranged opposite one another and two, second magnet edges arranged opposite one another, wherein, in the case of a measuring tube in rest position and considering the magnet end surface in a projection onto a first face of a circuit board layer, the second magnet edges extend in the direction of an oscillation direction of the measuring tube in parallel with the second side into the central region, wherein a first magnet edge facing the second side bisector is spaced a distance from the second side bisector, wherein the measuring tube is adapted to oscillate with an oscillation amplitude, wherein the distance is greater than half the oscillation amplitude, wherein the first magnet edge facing the second side bisector extends especially in parallel with the second side bisector.

In an embodiment, the magnet end surface is rectangular.

In an embodiment, the second magnet edge in the case of a measuring tube in rest position overlaps the winding region completely in the direction of the second magnet edge.

In this way, an interaction between magnet and coil apparatus is improved.

In an embodiment, a length of the first magnet edge is at least 5% and especially at least 10% and preferably at least 20% less than the first side length, or wherein a length of the first magnet edge is at least 50 micrometer and especially at least 75 micrometer and preferably at least 100 micrometer less than the first side length, and wherein the first magnet edge facing the second side bisector in the projection is spaced from the winding region in a direction in parallel with the second side bisector.

It is advantageous to position the magnet to a good approximation centrally relative to the first side bisector.

In an embodiment, the magnet end surface is perpendicular to a coil axis and has a separation of at least 20 micrometer and especially at least 40 micrometer and preferably at least 50 micrometer from the circuit board, and/or wherein the magnet end surface has a separation of, at most, 200 micrometer and especially, at most, 150 micrometer and preferably, at most, 120 micrometer from the circuit board.

A small separation of the magnet end surface from the coil apparatus increases the sensitivity of the coil apparatus to movements of the magnet. A minimum separation from the coil apparatus reduces a chance of destruction of the coil apparatus in the assembling of the measuring transducer.

In an embodiment, the at least one magnet arranged on a measuring tube has a ring shape with a closed end and an open end, wherein the open end is adapted to surround an associated coil apparatus and to supply the coil apparatus with a magnetic field extending in parallel with a coil axis.

In this way, magnetic field lines of the magnet can to a good approximation be spatially homogeneously embodied and concentrate on the central region and the winding region and, because of this, increase a sensitivity of the coil apparatus to relative movements of the magnet.

In an embodiment, the measuring transducer comprises at least one pair of measuring tubes, wherein the measuring tubes of the pair are adapted to oscillate oppositely to one another, wherein at least one sensor and/or at least one exciter each have/has a coil apparatus with a coil as well as a magnet apparatus having at least two magnets, wherein at least one magnet is secured on each measuring tube of the measuring tube pair.

Two magnets extending into the central region of the coil from oppositely oscillating measuring tubes lead to a doubling of the change of a magnetic flux passing through the coil apparatus and, because of this, to a better sensitivity of the coil to magnetic field changes caused by measuring tube oscillations.

A measuring device of the invention comprises:
a measuring transducer;
an electronic measuring/operating circuit, wherein the electronic measuring/operating circuit is adapted to operate the sensors and the exciter, and is connected with these by means of electrical connections,
wherein the at least one electrical connection is led by means of a cable guide to the electronic measuring/operating circuit,
wherein the electronic measuring/operating circuit is further adapted to ascertain flow measured values and/or density measured values, and,
wherein the measuring device has especially an electronics housing for housing the electronic measuring/operating circuit.

BRIEF DESCRIPTION OF THE DRAWINGS

The invention will now be described based on examples of embodiments illustrated in the appended drawing, the figures of which show as follows:
FIG. 6 shows by way of example, arrangements of coil apparatuses and magnet apparatuses for two measuring tubes.

DETAILED DESCRIPTION

Figure 1:
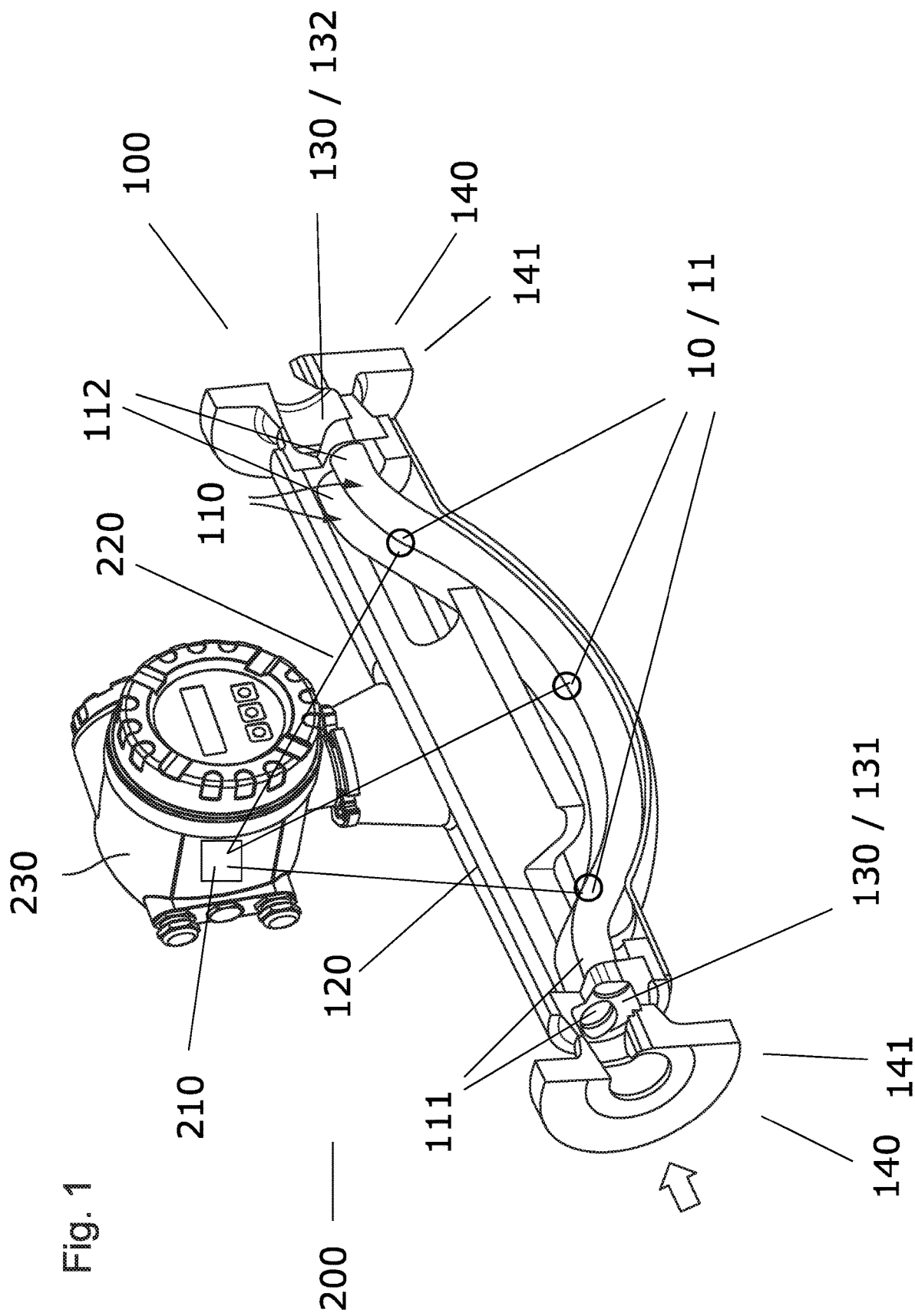
FIG. 1 shows a measuring device of the invention having a measuring transducer of the present disclosure.

FIG. 1 shows a measuring device 200 having a measuring transducer 100, wherein the measuring transducer has two measuring tubes 110, which are held by a support body 120 of the measuring transducer. The measuring tubes communicate on the inlet side with a first manifold 131 and on the outlet side with a second manifold 132, wherein the first manifold 131 of the manifolds 130 is adapted to receive a medium inflowing from a pipeline (not shown) into the measuring transducer and to distribute such uniformly to the measuring tubes. Correspondingly, the second manifold 132 is adapted to receive medium draining from the measuring tubes and to transfer such back into the pipeline. The measuring transducer is, in such case, inserted via process connections 140, especially flanges 141, into the pipeline. The measuring transducer includes an oscillation exciter 11, which is adapted to excite the measuring tubes to oscillate. The measuring transducer includes, supplementally, two oscillation sensors 10, which are adapted to register the oscillations of the measuring tubes. Those skilled in the art are not limited to the numbers of measuring tubes, oscillation exciters and oscillation sensors shown here. The embodiment shown here is thus by way of example.

The measuring device includes an electronic measuring/operating circuit 210, which is adapted to operate the oscillation exciter as well as the oscillation sensors, and to calculate and to output mass flow- and/or density measured values of the medium. The electronic measuring/operating circuit is, in such case, connected by means of electrical connections 220 with the oscillation sensors as well as with the oscillation exciter. The measuring device includes an electronics housing 230, in which the electronic measuring/operating circuit is arranged. For determining the mass flow, the measuring device utilizes the Coriolis effect of the medium flowing through the measuring tubes, in the case of which the flow influences the measuring tube oscillations characteristically.

FIG. 2a) shows a plan view of an advantageous coil apparatus 1 of the invention with a circuit board 2, which has a plurality of circuit board layers 3 with, in each case, a first face 3.1 and a second face 3.2. A coil 4 having a first coil end 4.1 and a second coil end 4.2 is applied in the form of an electrically conductive trace 4.3 such as shown here on a first face 3.1. Other circuit board layers can have other coils, which are connected together, for example, with vias 7, wherein, for example, a first via 7.1 connects first coil ends, and wherein a second via 7.2 connects second coil ends together, which would correspond to a connecting of coils in parallel. Alternatively, instead of the galvanic, parallel connecting of the coils, also a galvanic, serial connecting can occur, wherein coil ends of neighboring coils are connected, for example, by means of vias, and wherein adjoining coils, in each case, have an oppositely moving rotational sense of their electrically conductive traces.

Important is that the coils of different circuit board layers produce constructively interfering magnetic fields upon the application of an electrical, direct voltage between the vias. Alternatively, instead of the here described galvanic, parallel connecting of the coils, also a galvanic, serial connecting can be used, wherein coil ends of neighboring coils are connected, for example, by means of vias, and wherein adjoining coils have, in each case, an oppositely moving rotational sense of their electrically conductive traces. Those skilled in the art can design coil apparatuses according to their particular requirements. A coil apparatus includes contacting elements 5, by means of which the coil apparatus is connectable by means of electrical connecting lines 220 (see FIGS. 1 and 6) with an electronic measuring/operating circuit 210 (see FIG. 1) of a measuring device.

Coil 4 includes a winding region WR and a central region C lacking turns T of a winding, wherein the central region has a rectangular shape with two opposing, first sides S1 and two opposing, second sides S2. The first sides S1 have a first side length, and the second sides have a second side length, wherein a ratio of first side length to second side length is greater than 2, and especially greater than 3 and preferably greater than 3.5. The side, on which the coil end is located The first side length is, for example, at least 3 millimeter and especially at least 4 millimeter and preferably at least 5 millimeter and/or at most 20 millimeter and especially, at most, 15 millimeter and preferably, at most, 12 millimeter, while the second side length is, for example, at least 0.3 millimeter and especially at least 0.5 millimeter and preferably at least 1 millimeter and/or, at most, 5 millimeter and especially, at most, 4 millimeter and preferably, at most, 3 millimeter. Larger geometric coil dimensions improve signal/noise ratio, when a magnet applied for induction of electric fields in the coil has similar dimensions as regards the first side. A magnet must not, however, be too heavy, since otherwise it can influence measuring tube oscillations to an undesirable degree. One skilled in the art with experience in the construction of measuring transducers, or measuring devices, of the type used for the invention can estimate maximum geometric dimensions of such a magnet and therefrom derive upper limits for the first side, and second side, of the coil.

A coil of the invention has, in such case, at least 4 turns T and preferably at least, such as shown here, 6 turns T.

Figure 2:
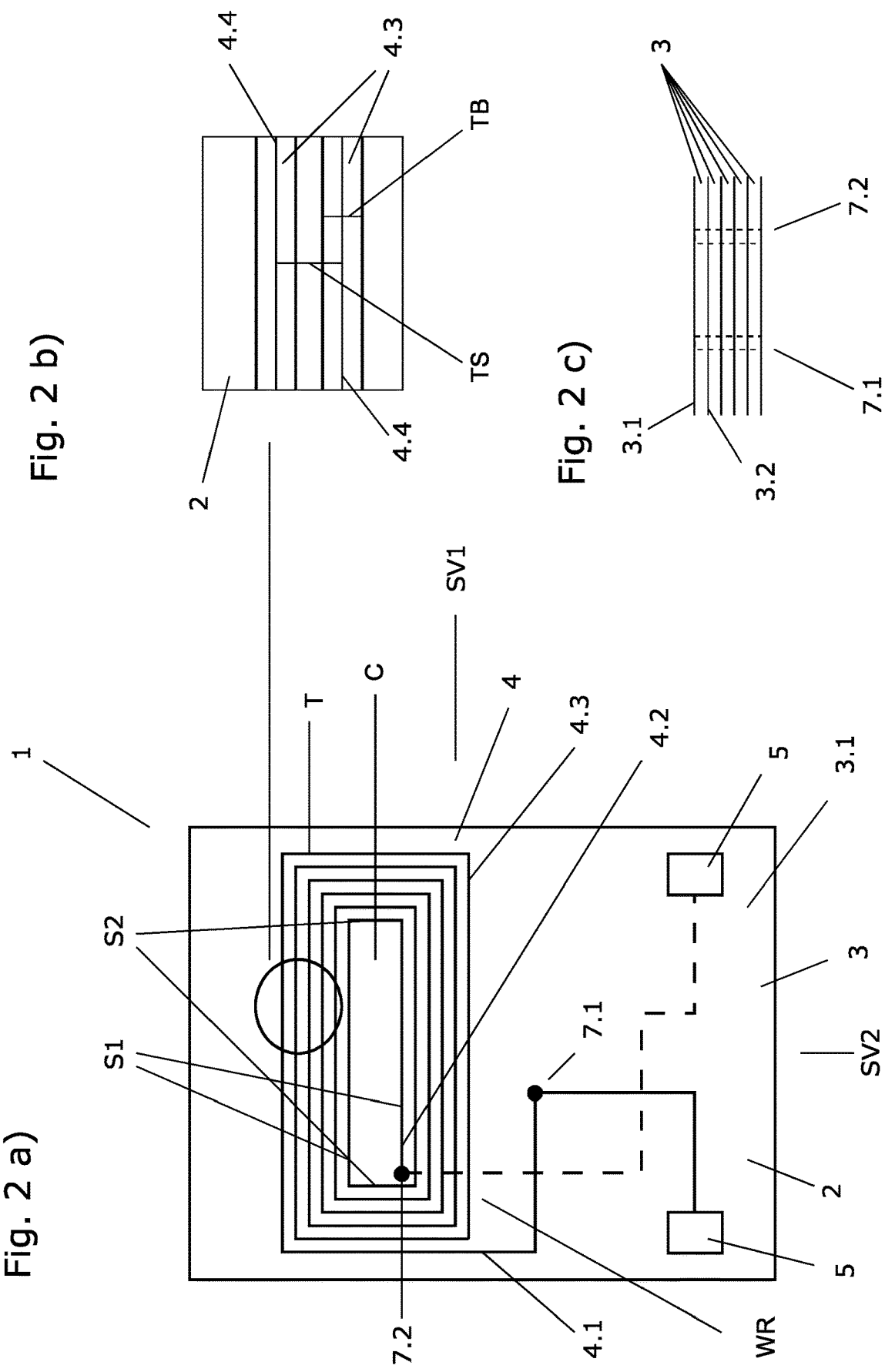
FIGS. 2 a) to c) shows schematically, a coil apparatus of the present disclosure.

FIG. 2 b) shows an enlarged detail of the winding region WR with two sections of neighboring turns T. Focusing on a trace centerline 4.4, the turns have a turn separation TS, which is less by a factor F than two times the trace breadth, wherein F is at least 1, and especially at least 1.2 and preferably at least 1.4. The trace breadth TB is, in such case, less than 500 micrometer, and preferably less than 400 micrometer and especially less than 300 micrometer.

As shown in FIG. 2 c), a circuit board 3 can have a plurality of circuit board layers, wherein a plurality of circuit board layers have, in each case, a coil. The coils of a plurality of circuit board layers are, in such case, connected by vias 7.1, 7.2, such that the coils of different circuit board layers produce constructively interfering magnetic fields upon the application of an electrical voltage across the vias. For example, such as shown here, a first via 7.1 can connect first coil ends 4.1 and a second via 7.2 second coil ends 4.2 of different coils together. This corresponds to a parallel circuit of different coils. Alternatively, adjoining coils can be connected together via adjoining coil ends, wherein a first coil end of an outer coil is connected with a contacting element 5, and wherein a second coil end of an additional outer coil is connected with another contacting element, and wherein adjoining coil ends are connected by means of vias. This would correspond to a series connection of different coils.

Preferably, a coil apparatus has at least 6, and preferably at least 8 and especially at least 10 coils, which are stacked by means of circuit board layers. A circuit board layer forming substrate is, in such case, preferably thinner than 200 micrometer and preferably thinner than 150 micrometer. The substrate comprises, in such case, for example, the material, DuPont 951. The electrically conductive trace applied on the substrate comprises, in such case, for example, the material, DuPont 614SR.

Different coils have, in such case, an ohmic resistance of less than 50 ohm and especially less than 40 ohm and preferably less than 30 ohm, wherein differences of the ohmic resistances of different coils are less than 10 ohm, and especially less than 5 ohm and preferably less than 2 ohm.

Figure 3:
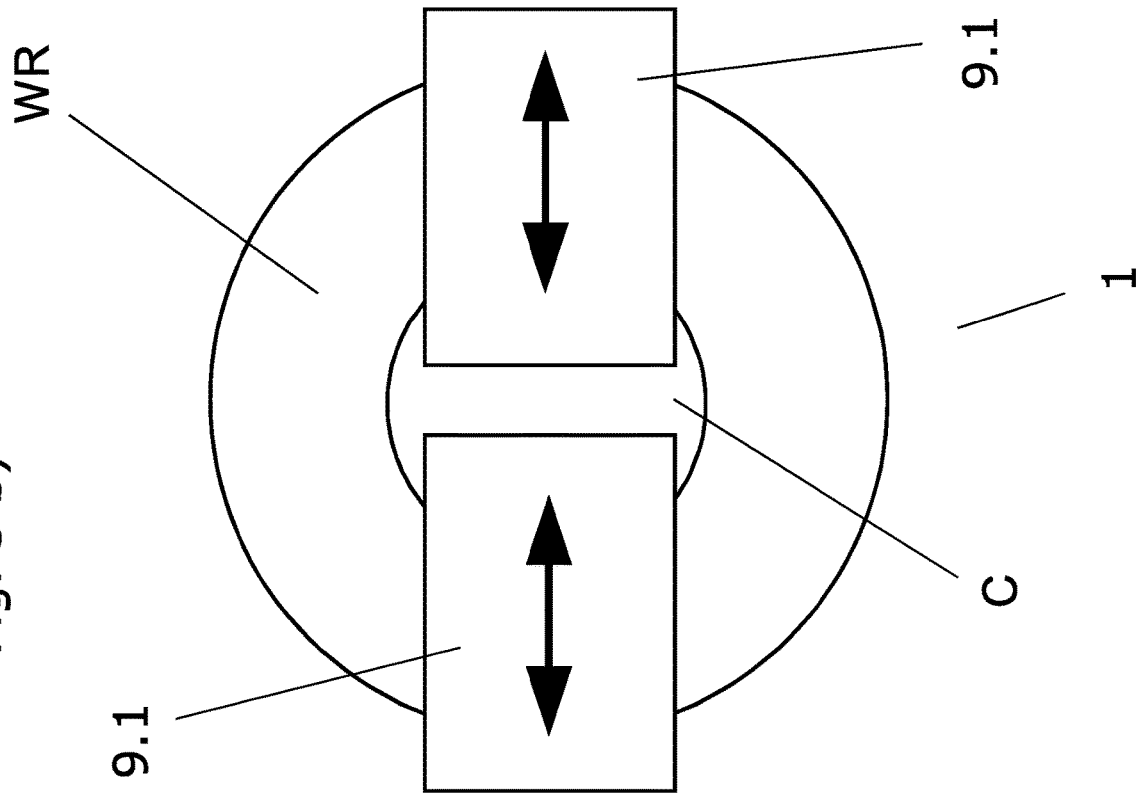
FIGS. 3 a) and b) shows schematically, a comparison of a coil apparatus of the present disclosure and a coil apparatus of the state of the art.
Figure 3:
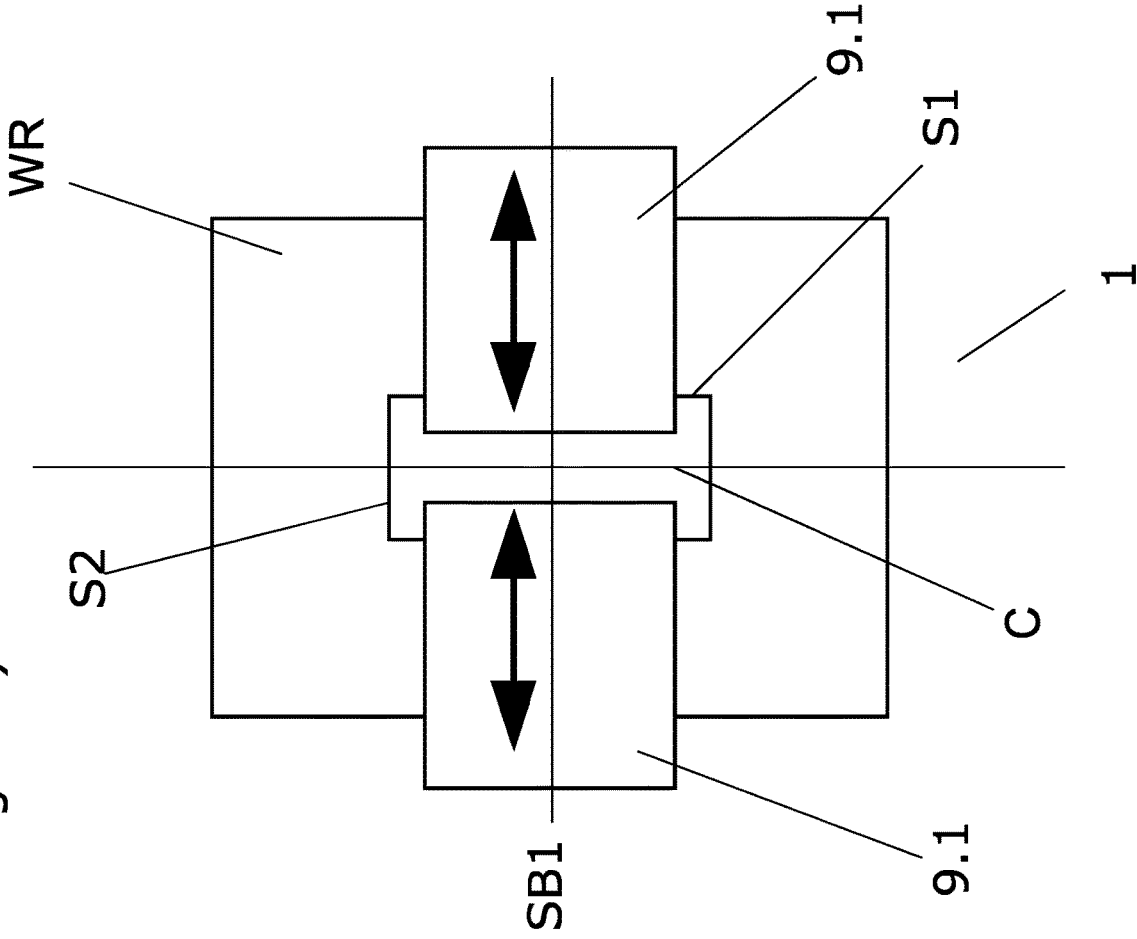

FIGS. 3 a) and b) show, by way of example, a comparison between a coil apparatus 1 of the invention, see FIG. 3 a), and a conventional coil arrangement 1, see FIG. 3 b). Shown in both cases, by way of example, is a magnet apparatus 9 having two magnets 9.1, wherein each magnet 9.1 is secured on a different one of two measuring tubes (not shown), in order to follow the oppositely moving movements of the measuring tubes. The rectangular central region C of the coil apparatus of the invention has a first side S1 with a side length, which equals a diameter of the round central region C of the conventional coil arrangement. The area of the rectangular central region is, in such case, less than the area of the round central region. A measuring tube oscillation with given amplitude in the case of magnets of equal dimensions compared with the particular area of the central region in the case of the rectangular central region leads to a, relatively considered, greater change of a magnetic field passing through the coil apparatus. Thus, a density of a medium or a mass flow of a medium flowing through the measuring tube can be determined more exactly.

Figure 4:
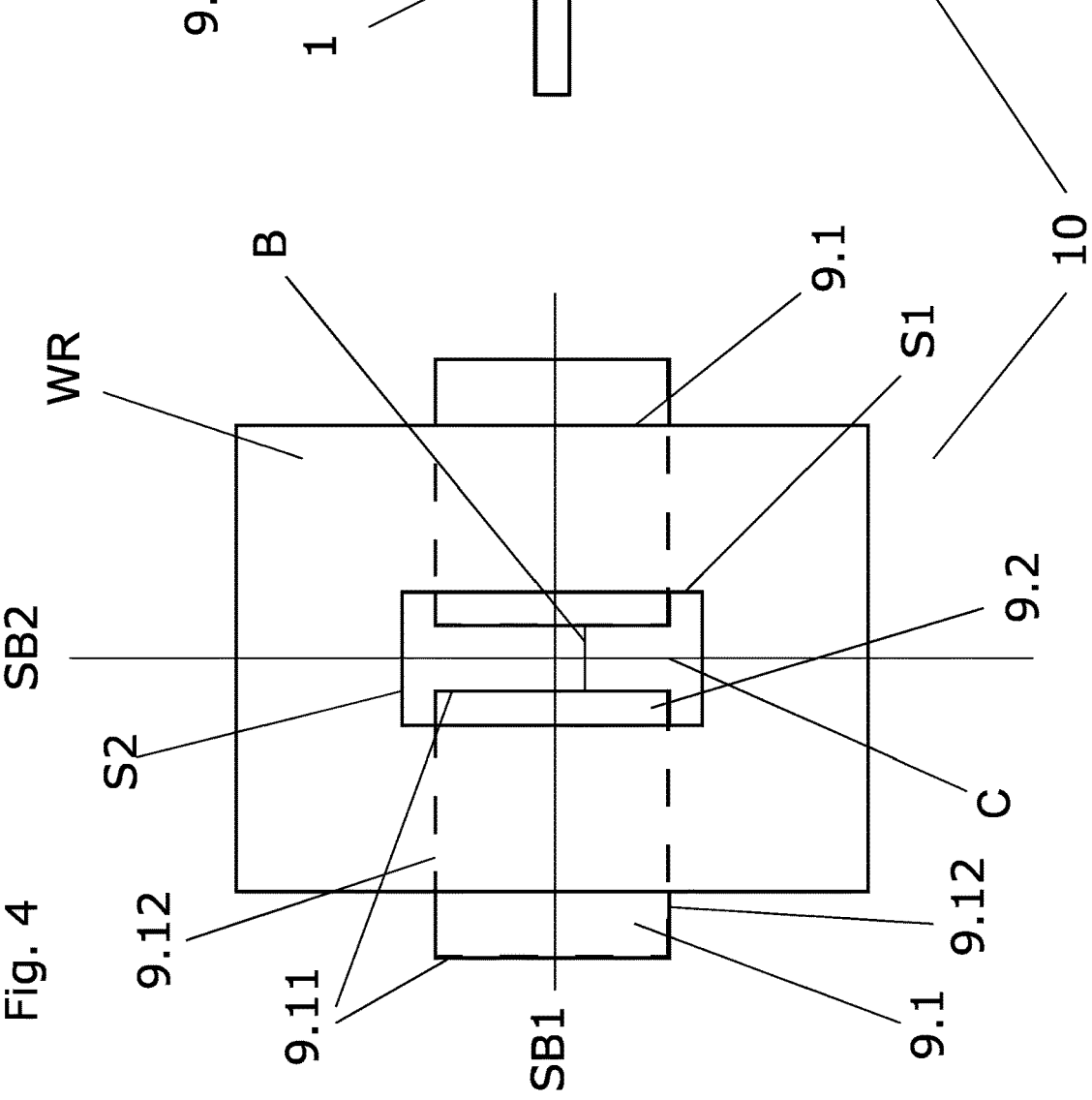

FIG. 4 shows schematically a plan view of a sensor having a coil apparatus and magnets 9.1 of a magnet apparatus 9 matched to the coil apparatus. Each magnet is secured to a different one of two measuring tubes (not shown) and the measuring tubes oscillate opposite to one another.

The magnets have, in each case, a magnet end surface 9.2 facing the coil apparatus and bordered by first magnet edges 9.11 and second magnet edges 9.12. The distance of a first magnet edge from the second side bisector SB2 of the second side of the central region amounts in the case of a measuring tube in resting position preferably to a minimum of 30 micrometer, and especially a minimum of 60 micrometer. The first magnet edge facing the second side bisector is, in such case, preferably in parallel with the second side bisector. The magnet end surface is, in such case, advantageously, however, not necessarily, rectangular. The magnets 9.1, in such case, overlap the winding region WR in the direction of their second magnet edges 9.12 preferably completely. The first magnet edges 9.11 have, in such case, a lesser length than the first sides S1 of the central region, wherein the magnets are preferably arranged essentially symmetrically about the first side bisector SB1.

Instead of two measuring tubes with, in each case, at least one magnet, which is associated with a sensor, a measuring transducer can also have only one measuring tube with at least one magnet, by means of which an electrical voltage is inducible in the coil apparatus.

Figure 5:
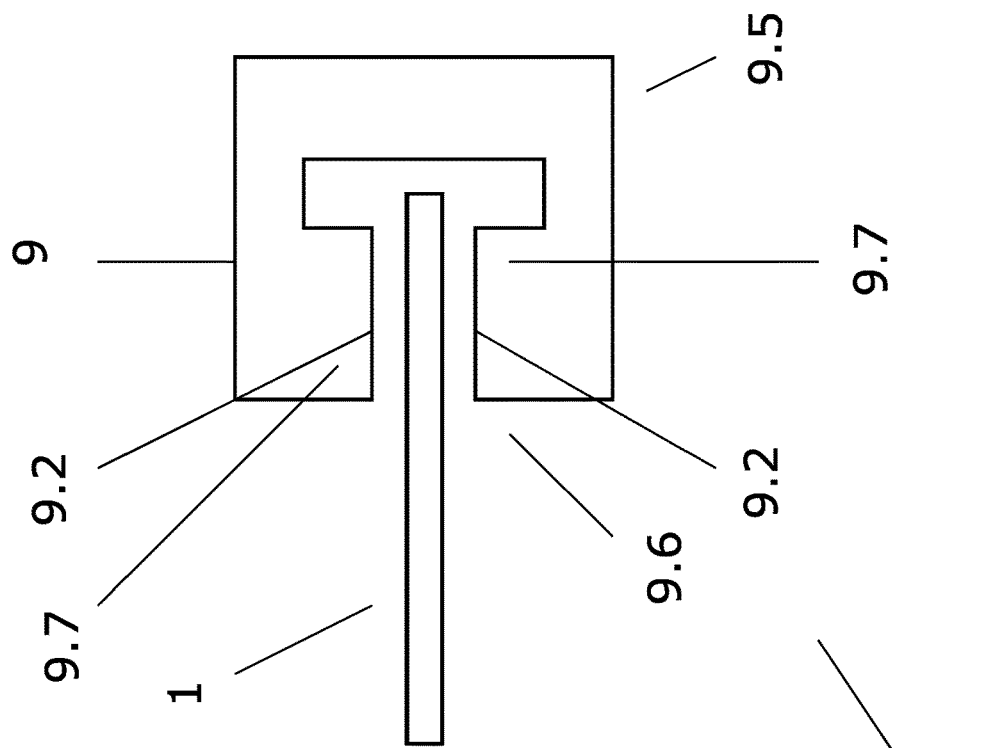
FIGS. 4 and 5 shows schematically by way of example, embodiments of sensors of the present disclosure.

FIG. 5 shows, by way of example, a side view of another coil apparatus, wherein the side view can be obtained by means of a rotation of 90 degree of the embodiment shown in FIG. 4 around the first side bisector. Instead of a magnet with a magnet end surface facing toward the coil apparatus, the magnet has a ring shape, so that two mutually facing side surfaces 9.2 facing an interposed coil apparatus supply the coil apparatus in a limited region with an approximately spatially homogeneous magnetic field, wherein the magnet surrounds the coil apparatus.

FIG. 6 shows a side view of two measuring tubes 110 (one tube hidden behind the other) of a measuring device having two oscillation sensors 10 comprising, in each case, a coil apparatus 1 of the invention, as seen from a side view SV2, see FIG. 2, wherein the oscillation sensor components are connected, in each case, by means of a holder H with a different one of the measuring tubes 110 and are adapted to follow their oscillatory movements, such as shown by the inlet side section IS, or the coil apparatuses are mechanically connected with the support body 120 by means, in each case, of a holder H, such as shown by the outlet side section OS. Thus, a cross sectional plane CP divides the at least one measuring tube into the inlet side section IS as well as the outlet side section OS. In the case of coil apparatuses arranged on a measuring tube, the arrangement of contacting elements according to the invention can be used to connect electrical connecting lines 220 to a side of the coil apparatus facing the measuring tube. A connecting of an electrical line to a side of the coil apparatus facing away from the measuring tube, see dashed line, as necessary in the state of the art, can thus be omitted. For example, by preventing oscillatable bends of the electrical connection, the risk of a break of the contact between electrical connection and contact element is prevented. Magnet apparatuses 9, which such as shown here are mounted on a second measuring tube hidden by the shown measuring tube and are adapted to follow its oscillatory movements, interact in measurement operation with the associated coil apparatuses via electromagnetic fields. Thus, in the presence of opposing measuring tube oscillations, the oscillations are registrable by means of electrical voltages induced in the coil.

In case the coil apparatuses are secured on the support body, the electrical connections can be led along the support body. In such case, the arrangement of the invention enables electrical connections of equal length measured from contacting elements and an equal guiding of the electrical connections.

Alternatively, the measuring transducer can have, for example, only one measuring tube, wherein magnet apparatuses of sensors are, for instance, secured to the measuring tube, and the associated coil apparatuses are secured to the support body, or vice versa. The measuring transducer can also have more than two measuring tubes. Those skilled in the art can adapt coil apparatuses corresponding to requirements.

The at least one measuring tube can, such as shown here, have at least one bend or also extend in a straight line. The applicability of the coil apparatus is independent of measuring tube geometry.

The invention claimed is:

1. A measuring transducer of a measuring device for registering a mass flow or a density of a medium flowing through at least one measuring tube of the measuring transducer, comprising:
the at least one measuring tube having an inlet and an outlet and adapted to convey the medium between inlet and outlet;
at least one exciter, which is adapted to excite the at least one measuring tube to execute oscillations; and at least two sensors, which are adapted to register deflections of oscillations of at least one measuring tube,
wherein the exciter as well as the sensors have, in each case, a coil apparatus and, in each case, a magnet apparatus, wherein the magnet apparatuses are movable relative to their coil apparatuses, and wherein the magnet apparatus and the coil apparatus of an exciter, or sensor, as the case may be, interact by means of magnetic fields,
wherein the measuring transducer has a support body, which is adapted to hold the at least one measuring tube,
wherein the sensors have, in each case, a coil apparatus, wherein the coil apparatus includes:
a circuit board having at least one circuit board layer, wherein each circuit board layer has a first face and second face planparallel to the first face,
at least one coil adapted for registering or producing a time varying magnetic field, wherein the coil is embodied at least sectionally by means of an electrically conductive trace,
wherein the coil is arranged on the first face or second face of a circuit board layer,
wherein the at least one coil has, in each case, a first coil end and, in each case, a second coil end,
wherein an at least one, first coil end as well as at least one, second coil end are connected, in each case, with a contact therefor,
wherein the at least one coil has, in each case, a winding region and a central region lacking turns of a winding, wherein the central region of a coil has a rectangular shape with oppositely lying, first sides and with oppositely lying, second sides, wherein the first sides have a first side length, and wherein the second sides have, in each case, a second side length,
wherein the rectangular shape of the central region has a first side bisector belonging to the first side as well as a second side bisector belonging to the second side, wherein the electrically conductive trace has a trace breadth of at least micrometer,
wherein a ratio of first side length to second side length is greater than 3.25,
wherein a measuring tube oscillatory deflection has an oscillation direction in parallel with the second side of the rectangular shape of the central region;
wherein the magnet apparatus of a sensor or exciter on at least one measuring tube has at least one magnet having at least one magnet end surface facing toward the coil apparatus,
wherein the magnet end surface is bounded by two, first magnet edges arranged opposite one another and two, second magnet edges arranged opposite one another,
wherein, in the case of a measuring tube in rest position and considering the magnet end surface in a projection onto a first face of a circuit board layer, the second magnet edges extend in the direction of an oscillation direction of the measuring tube in parallel with the second side into the central region, wherein a first magnet edge facing the second side bisector is spaced a distance from the second side bisector, wherein the measuring tube is adapted to oscillate with an oscillation amplitude, wherein the distance is greater than half the oscillation amplitude,
wherein the first magnet edge facing the second side bisector extends in parallel with the second side bisector.

2. The measuring transducer of claim 1,
wherein the magnet end surface is rectangular.

3. The measuring transducer of claim 1,
wherein the second magnet edge in the case of a measuring tube in rest position overlaps the winding region completely in the direction of the second magnet edge.

4. The measuring transducer of claim 1,
wherein a length of the first magnet edge is at least 5%, or
wherein a length of the first magnet edge is at least 50 micrometer, and
wherein the first magnet edge facing the second side bisector in the projection is spaced from the winding region in a direction in parallel with the second side bisector.

5. A measuring transducer of a measuring device for registering a mass flow or a density of a medium flowing through at least one measuring tube of the measuring transducer, comprising:
the at least one measuring tube having an inlet and an outlet and adapted to convey the medium between inlet and outlet;
at least one exciter, which is adapted to excite the at least one measuring tube to execute oscillations; and at least two sensors, which are adapted to register deflections of oscillations of at least one measuring tube,
wherein the exciter as well as the sensors have, in each case, a coil apparatus and, in each case, a magnet apparatus, wherein the magnet apparatuses are movable relative to their coil apparatuses, and wherein the magnet apparatus and the coil apparatus of an exciter, or sensor, as the case may be, interact by means of magnetic fields,
wherein the measuring transducer has a support body, which is adapted to hold the at least one measuring tube, wherein the sensors have, in each case, a coil apparatus, wherein the coil apparatus includes:
a circuit board having at least one circuit board layer, wherein each circuit board layer has a first face and second face planparallel to the first face,
at least one coil adapted for registering or producing a time varying magnetic field,
wherein the coil is embodied at least sectionally by means of an electrically conductive trace,
wherein the coil is arranged on the first face or second face of a circuit board layer,
wherein the at least one coil has, in each case, a first coil end and, in each case, a second coil end,
wherein an at least one, first coil end as well as at least one, second coil end are connected, in each case, with a contact therefor,
wherein the at least one coil has, in each case, a winding region and a central region lacking turns of a winding, wherein the central region of a coil has a rectangular shape with oppositely lying, first sides and with oppositely lying, second sides, wherein the first sides have a first side length, and wherein the second sides have, in each case, a second side length,
wherein the rectangular shape of the central region has a first side bisector belonging to the first side as well as a second side bisector belonging to the second side, wherein the electrically conductive trace has a trace breadth of at least micrometer,
wherein a ratio of first side length to second side length is greater than 3.25,
wherein a measuring tube oscillatory deflection has an oscillation direction in parallel with the second side of the rectangular shape of the central region;
wherein the magnet end surface is perpendicular to a coil axis and has a separation of at least 20 micrometer, or
wherein the magnet end surface has a separation of 200 micrometer.

6. The measuring transducer of claim 5, wherein the at least one magnet arranged on a measuring tube has a ring shape with a closed end and an open end, wherein the open end is adapted to surround an associated coil apparatus and to supply the coil apparatus with a magnetic field extending in parallel with a coil axis.

7. The measuring transducer of claim 5, wherein the measuring transducer comprises at least one pair of measuring tubes, wherein the measuring tubes of the pair are adapted to oscillate oppositely to one another,
wherein at least one sensor or at least one exciter each have a coil apparatus with a coil as well as a magnet apparatus having at least two magnets,
wherein at least one magnet is secured on each measuring tube of the measuring tube pair.

\* \* \* \* \*